United States Patent [19]

Jan de Putter

[11] Patent Number: 4,754,781
[45] Date of Patent: Jul. 5, 1988

[54] PLASTIC PIPE COMPRISING AN OUTER CORRUGATED PIPE AND A SMOOTH INNER WALL

[75] Inventor: Warner Jan de Putter, Hardenberg, Netherlands

[73] Assignee: Wavin B. V., Zwolle, Netherlands

[21] Appl. No.: 899,087

[22] Filed: Aug. 22, 1986

[30] Foreign Application Priority Data

Aug. 23, 1985 [NL] Netherlands ............... 8502327

[51] Int. Cl.$^4$ .................................................. F16L 55/18
[52] U.S. Cl. ................................. 138/98; 138/97; 138/137; 138/121; 138/122; 138/141; 138/173; 138/148
[58] Field of Search ............... 138/121, 122, 148, 113, 138/114, 173, 97, 98

[56] References Cited

U.S. PATENT DOCUMENTS

| | | | |
|---|---|---|---|
| 2,898,941 | 8/1959 | Kilcup | 138/121 |
| 3,550,639 | 12/1970 | Okuda | 138/121 |
| 3,640,312 | 2/1972 | Bauman et al. | 138/121 |
| 3,665,967 | 5/1972 | Kachnik | 138/178 X |
| 4,037,626 | 7/1977 | Roberts | 138/121 X |
| 4,269,234 | 5/1981 | Johnson et al. | 138/121 |
| 4,303,104 | 12/1981 | Hegler et al. | 138/121 |
| 4,312,383 | 1/1982 | Kleykamp | 138/121 |
| 4,487,232 | 12/1984 | Kanao | 138/173 X |

FOREIGN PATENT DOCUMENTS

| | | | |
|---|---|---|---|
| 522825 | 10/1953 | Belgium | 138/122 |
| 2840174 | 3/1980 | Fed. Rep. of Germany | 138/121 |
| 965640 | 8/1964 | United Kingdom | 138/122 |

*Primary Examiner*—James E. Bryant, III
*Attorney, Agent, or Firm*—A. Robert Theibault

[57] ABSTRACT

A plastic pipe consisting of an outer corrugated plastic pipe and an inner smooth wall consisting of a wear resistant elastomer, particularly a thermoplastic rubber fixed in the inner bottoms wave valleys to said outer corrugated pipe. The inner wall consists of a pipe which has been coextruded with the outer corrugated pipe so that the inner and outer pipe are heat welded to each other.

The cavities between the inner pipe and the corrugations may be filled with a foam plastic.

This plastic pipe is used for repairing or renewing a sewage pipe by installing such a pipe from a vertical shaft of the sewage system into the sewage pipes. The interstices between the outer side of the corrugation and the inner side of the sewage pipe may be filled with a mortar.

7 Claims, 2 Drawing Sheets

PLASTIC PIPE COMPRISING AN OUTER CORRUGATED PIPE AND A SMOOTH INNER WALL

BACKGROUND OF THE INVENTION

The invention relates to a plastic pipe comprising an outerpipe with rigid external corrugations being at least covered on their inner side by sealing surfaces made of deformable material to form an essentially smooth inner wall.

A plastic pipe of this type is known from German Auglegeschrift No. 2.413.878.

If the sealing surfaces of such a pipe consist of a plastic film of plasticised polyvinyl chloride having a thickness of 0.05 mm, said pipe is readily deformable and can easily be installed at the correct required place from many different positions.

A drawback of said pipe is, however, the poor resistance to wear, so that only liquids can be transported through the pipe. If liquids containing solid substances are transported, a plastic film of this type forming the inner wall of the pipe, is very rapidly damaged, resulting in an unusable pipe.

SUMMARY AND OBJECTS OF THE INVENTION

The invention aims to provide a plastic pipe of the abovementioned type which does not present these disadvantages.

Thereto this plastic pipe is provided with sealing surfaces consisting of a material possessing elastic properties.

A plastic pipe of this type is deformable in a similar manner to a plastic pipe without sealing surfaces, but offers the great advantage that the inner side is very resistant to wear and is therefore suitable for transporting media containing solid particles or for passing through cables and the like.

More particularly, a plastic pipe of this type lends itself for use in a method for the repair or renewal of a sewage pipe system by installing a plastic pipe in an existing concrete sewage pipe from an essentially vertical access to a sewage pipe system.

A method of this type for the repair or renewal of a sewage pipe system by pulling a plastic sleeve into such sewage pipes is generally known since the sewage pipe systems made of concrete pipes and dating in many cases from the last century or from the beginning of this century are, in particular, now exhibiting the drawback of leakage at various points, so that the waste water transported through sewage pipe systems of this type has a strongly contaminating effect on the soil or groundwater surrounding the sewage pipe systems.

In view of the considerable damages to road or street covering during the breaking up and replacement of said sewage pipe systems by new plastic pipes or concrete pipes, this method can often not be applied in practice. Nor does lining of the sewage pipe systems with plastic sheets always provide a solution since this method can only be applied if the sewage pipes have such dimensions that they are accessible for people, which is usually not the case.

Although it has been proposed to wind a wound pipe from a plastic strip in the existing concrete sewage pipes, difficulties often occur in welding the edges of the plastic profiled strip to each other and on account of the equipment to be used in forming this connection.

The invention therefore also relates to a method of repairing or renewing a sewage pipe system by installing a plastic pipe in an existing concrete sewage particularly pipe from an essentially vertical access to a sewage pipe system, said plastic pipe comprising an outer pipe with rigid external corrugations which are at least covered on their innner side, by particularly wear-resistant, sealing surfaces of a material possessing elastic properties to form a substantially smooth inner wall.

Advantageously the sealing surfaces are formed from an elastomer, more particularly, a thermoplastic elastomer, while the outer pipe consists of a polyolefin or substantially of a polyvinylchloride. An outer pipe consisting substantially of polyvinylchloride means that said PVC pipe may contain substances improving the impact strength or components improving other properties of said pipe. Expediently the sealing surfaces are attached to the outside pipe chemically, physicochemically and/or mechanically, particularly by welding. Very preferably the assembly of outer corrugated pipe and inner pipe of material possessing elastic properties are formed by coextrusion. During coextrusion an outer smooth extruded pipe is corrugated and the inner pipe is simultaneously fixed to the inner side of the wave valleys of the outer pipe.

This can be achieved particularly with an olefin based thermoplastic elastomer such as an ethylene based and/or propylene based thermoplastic elastomer and an outer pipe consisting of a polyolefin such as polyethylene or polypropylene weldably joined thereto. Said pipes are very wear-resistant in an aqueous medium.

The invention is now hereinafter clarified with reference to an embodiment as shown in the drawing.

DETAILED DESCRIPTION OF A PREFERRED EMBODIMENT

Figure 1:
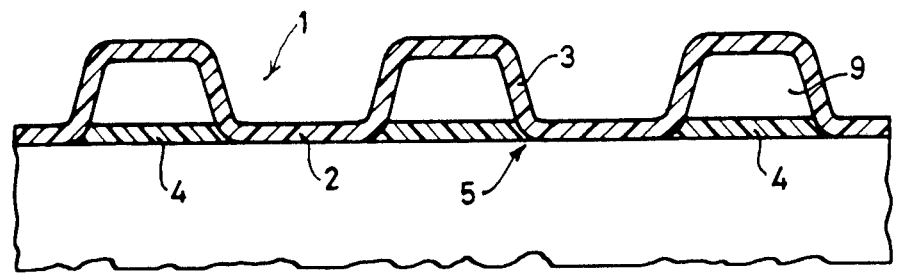
FIG. 1 shows a plastic pipe according to the invention.

In FIG. 1 of the drawings a section is shown of a plastic pipe 1 which may be used for the repair or renewal of a sewage pipe system. Said plastic pipe 1 consists of an outer pipe 2 with rigid external corrugations 3 which are covered on their inner side by sufficiently wear-resistant sealing surfaces 4, made of a material possessing elastic properties, to form an essentially smooth inner wall 5. The sealing surfaces are 0.5 mm thick, but it will be obvious that said thickness may be greater.

The sealing surfaces 4 may, for example, be attached by adhesive bonding or by welding between the walls which define the open sides of the cavity 9 formed by the rigid external corrugations 3.

Figure 2:
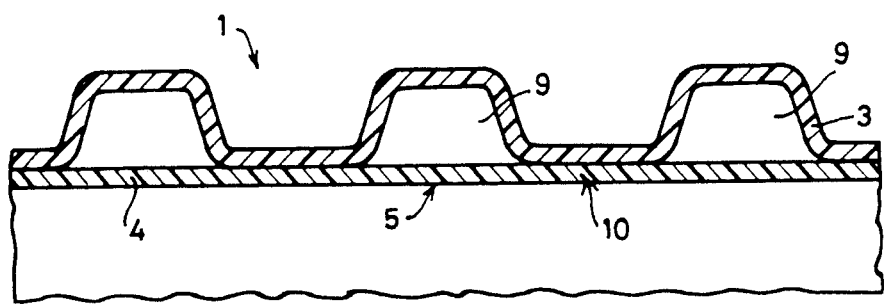
FIG. 2 shows a variant of a plastic pipe of this type.

In FIG. 2 another embodiment is shown in which the sealing surfaces 4 are joined to each other to form an inner pipe 10 with a smooth inner wall. Said inner pipe 10 consists of a thermoplastic elastomer, while the outer pipe 2 consists of polypropylene. The assembly of inner pipe and outer pipe has been formed by coextrusion.

Figure 3:
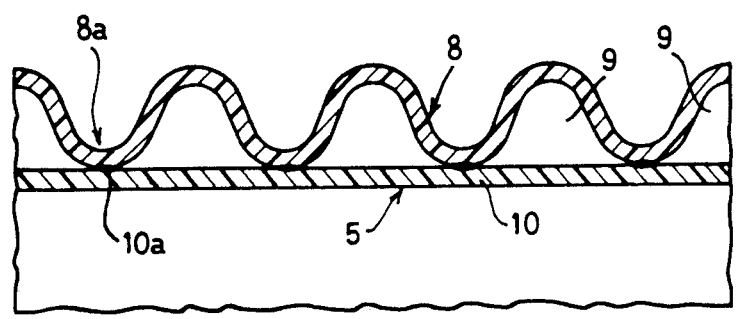
FIG. 3 shows yet another variant.

FIG. 3 shows an embodiment in which the rigid external corrugations 3 of the outer pipe together form a corrugated pipe 8 with wave valleys 8a. The inner pipe comprising the sealing surfaces 4 consist of a thermoplastic elastomer. By suitable choice of the plastic of the corrugated pipe 8, for example a polyethylene or a polypropylene plastic pipe, and of an inner pipe made of a ethylene or propylene based thermoplastic elastomer, the inner pipe providing the sealing surfaces 4 is attached by welding, such as during coextrusion in the wave valleys 8a to the corrugated pipe, in which process welded joints 10a are produced. Preferably these pipes have been manufactured by coextrusion automatically.

Figure 4:
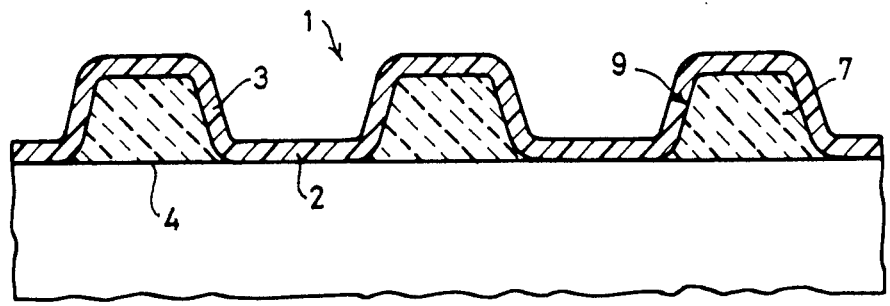
FIG. 4 shows yet another variant.

Finally, FIG. 4 shows yet another embodiment in which the cavities 9 of the external corrugations 3 of the outer pipe are filled with a compressible foam 7 made of a thermoplastic plastic. This compressible foam may consist of, for example a polyolefin foam, a polyurethanfoam, or for example, foam of an elastomer, in particular a thermoplastic elastomer.

Suitable materials for the sealing surfaces 4 of the inner pipe are thermoplastic Santoprene rubber, Kraton thermoplastic rubber, and Keltan thermoplastic rubber. These provide very wear-resistant surfaces in an aqueous medium of a thickness of at least 0.5 mm, for example 1 mm or more, is used.

Figure 5:
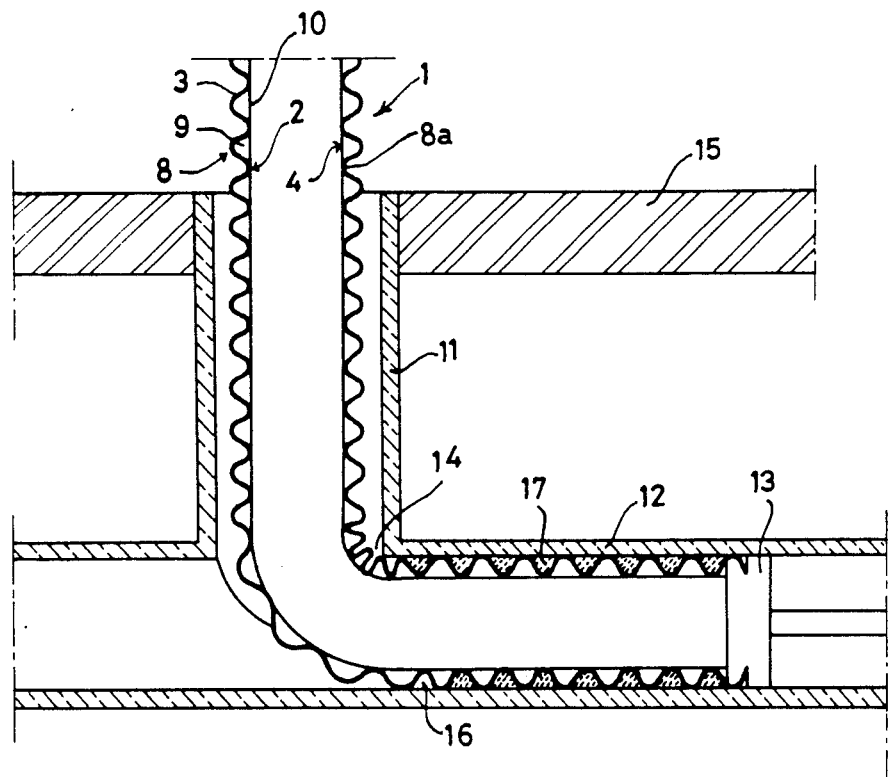
FIG. 5 a diagram illustrating the method according to the invention for repairing sewage pipes.

Finally, FIG. 5 shows a concrete sewage pipe 12 provided with an access leading to the surface of the road covering 15 in the form of a shaft 11. When a sewage pipe system with a concrete sewage pipe 12 of this type has to be repaired or renewed a plastic pipe 1 consisting of an outer pipe 2 with rigid external corrugations 3 which are covered on their inner side to form an essentially smooth inner wall 5 by sealing surfaces 4 made of a material possessing elastic properties and having a thickness of 1 mm, is guided into the shaft and bent over at the junction 14 between the access shaft 11 and a concrete sewage pipe 12 at an angle of virtually 90° C. and guided into the concrete sewage pipe, consecutively the plastic pipe is pulled through the concrete sewage pipe 12 by means of the pulling element 13.

Evidently by a suitable choice of the diameter of the outer pipe with rigid external corrugations 3 the outer side of the outer tube 2 and the inner side of the concrete sewage pipe will tightly engage each other.

The interstices 16 between the outer side of the corrugations 3 and the inner side of the concrete pipe 12 may expediently be filled with a curable material 17, for example a curable mortar.

What is claimed is:

1. In an existing concrete pipe sewage system having a sewage transfer pipe a replacement liner comprising an external length of extruded flexible externally continuously corrugated liner pipe flexible substantially along its whole length and being adapted to be introduced into said system form a substantially vertical position, to a substantially horizontal position said externally corrugated extruded liner pipe being sufficiently rigid to support a curable material on its outside and being covered on its inside of the corrugations with a deformable wear resistant thermoplastic elastomeric tubular extruded sleeve liner defining a cavity between the internal portion of the corrugations of said external length of said extruded external liner pipe and its corrugations forming with said sleeve liner an essentially smooth inner wall providing sealing surfaces closing the corrugations of said external pipe defining a smooth non turbulent path for fluids conveyed through said external liner pipe and its internal sleeve liner.

2. A sewage transfer pipe according to claim 1, wherein the sealing surfaces have a wall thickness of at least 0.5 mm.

3. A sewage transfer pipe according to claim 1, wherein the liner pipe is formed from a polyolefin or substantially from a polyvinylchloride.

4. A sewage transfer pipe according to claim 1, wherein the sealing surfaces are attached to the liner pipe chemically, physicochemically, or mechanically, particularly by coextrusion or by welding.

5. A sewage transfer pipe according to claim 1, wherein the cavity between the sealing surfaces and the inner side of the external corrugations is filled with a compressible foam made of thermoplastic plastic material.

6. A sewage transfer pipe according to claim 1, wherein the sealing surfaces are joined to each other into an integral inner pipe and/or the external corrugations adjoin each other to form a corrugated pipe.

7. A sewage transfer pipe according to claim 1, wherein the liner pipe consists of a polyolefinic material and the sealing surfaces joined to each other to form an inner pipe consisting of an olefin based thermoplastic elastomer being joined to the polyolefin of the outer pipe, in particular by coextrusion or welding.

* * * * *